(12) United States Patent
Penot

(10) Patent No.: US 7,999,680 B2
(45) Date of Patent: Aug. 16, 2011

(54) SAFETY EQUIPMENT FOR FREIGHT LOADING AND UNLOADING DOCKS

(75) Inventor: Etienne Penot, Saint-Sornin-Leulac (FR)

(73) Assignee: Glomot-Penot Systemes, Saint-Sornin-Leulac (FR)

( * ) Notice: Subject to any disclaimer, the term of this patent is extended or adjusted under 35 U.S.C. 154(b) by 343 days.

(21) Appl. No.: 12/453,055

(22) Filed: Apr. 28, 2009

(65) Prior Publication Data

US 2009/0267744 A1    Oct. 29, 2009

(30) Foreign Application Priority Data

Apr. 28, 2008 (FR) ...................................... 08 02414

(51) Int. Cl.
*G08B 13/14* (2006.01)
(52) U.S. Cl. ..................................... 340/572.1; 340/988
(58) Field of Classification Search ............... 340/572.1, 340/674, 686.6, 988
See application file for complete search history.

(56) References Cited

U.S. PATENT DOCUMENTS

| 5,260,694 | A  | * | 11/1993 | Remahl ......................... 340/674 |
| 7,613,617 | B2 | * | 11/2009 | Williams et al. ................ 705/1.1 |
| 7,907,052 | B2 | * | 3/2011  | Delaney, Jr. ............. 340/539.11 |

* cited by examiner

*Primary Examiner* — John A Tweel, Jr.
(74) *Attorney, Agent, or Firm* — Oliff & Berridge, PLC

(57) ABSTRACT

To inform warehousemen that a vehicle that has arrived at a dock is situated so as to allow loading or unloading operations, the dock is equipped with a series of radio identification tags placed in succession along an access lane to the dock and it is verified by appropriate devices associated with the dock whether a locating device placed in the immediate vicinity of the vehicle and carrying readers of radio identification tags is or is not arranged at a position with respect to a given direction in relation to the succession of tags along the access lane to the dock. The locating device is advantageously implemented in the form of a restraint chock for the wheels of the vehicle or in the form of any other means for immobilizing the latter at the dock.

16 Claims, 3 Drawing Sheets

SAFETY EQUIPMENT FOR FREIGHT LOADING AND UNLOADING DOCKS

BACKGROUND

The present invention relates to freight loading and unloading docks in which the transfer of parcels between a warehouse and transport vehicles is effected, the parcels being either brought into the warehouse or taken from the warehouse for delivery elsewhere. The invention aims to automatically provide safety information to improve the working conditions at the front of the docks to protect warehousemen, other operators and the transported freight.

SUMMARY

In some preferred embodiments, the invention is incorporated into the chocks that the dock personnel commonly use to block the wheels of vehicles to immobilize the vehicle in a position that is appropriate in relation to the dock. However, the invention may take other embodiments so long as they are placed in a given position in order to signal that the loading and unloading operations may be undertaken.

In accordance with one aspect of the invention, it is proposed to equip a vehicle access lane to the dock with a series of radio identification tags placed in succession along this lane and to verify by appropriate means associated with the dock whether a locating device, which carries readers of these tags, is or is not arranged in a given position with respect to the succession of tags along the access lane to the dock. The information that results from this verification is used, in particular, to alert the warehousemen that a vehicle that has arrived at the dock is situated so as to allow loading or unloading operations. The locating device is advantageously implemented in the form of a restraint chock for the wheels of the vehicle or in the form of any other means for immobilizing the latter at the dock.

In such a context, the invention is represented, in particular, in the form of equipment for freight loading or unloading docks in which the following are associated with each dock:
  radio identification tags arranged in series along an access lane to the dock for vehicles transporting freight that is to be loaded or unloaded,
  a device for locating the presence or absence of such a vehicle at the dock, the device composed of two sensors, which are spaced at a distance from each other and are able to interact with the tags to read and to retransmit their identification information, and
  means of analysis to use the identification information of the tags and information of an attribute unique to each reader to determine the order in which the readers are placed relative to the order of succession of the tags in the series.

According to some preferred embodiments, the invention thus has the advantage of wireless communication techniques for transmitting the information that is required to verify a correct position of the locating device as well as the ability to emit a signal to the warehousemen authorizing them to proceed with loading or unloading operations of vehicles that have been brought to the dock. These techniques make use advantageously of RFID (which stands for "radiofrequency identification") chips, which, in particular, make it very convenient to install equipment according to the invention in existing docks or groups of docks. For example, the various tags can be integrated individually in a simple groove made in the ground, and the sensors can then be fixed on the underneath face of a tool such as a chock that is commonly used to confirm the immobilization of freight transport trucks. According to other embodiments, the tags may be integrated into signaling strips, which are then stuck to the ground. By way of example, which is non-limiting in this case, they may be stuck on the bottom face, which is intended to be stuck to the ground, of such a signaling strip.

Preferably, each dock of a warehouse or of any other complex for loading and unloading freight to and from vehicles brought to the dock also includes, according to the invention, radio identification tags arranged in series along a dock access lane for transport vehicles for freight to be loaded or unloaded, said tags being, on the one hand, carriers and emitters of identification information characteristic for the order of succession of the tags in the series and, on the other hand, when the loading and unloading complex includes a plurality of docks, carriers and emitters of identification information characteristic of the dock along whose access lane the radio identification tags are placed in the series of docks.

In association with these tags, a mobile locating device is provided for each vehicle parking at a dock. That removable device is adapted to be placed in a given position in relation to this vehicle. The sensors on the locating device are constituted by two radiowave transmitter readers, that are so positioned on the locating device to then sense the signals emitted by at least two different tags of the series and relay them to an analysis system associated with the dock or the plurality of docks. These signals carry identification information unique to each of the tags and attribute information of a reader that distinguishes the two readers from each other.

At the analysis system, information-processing means are programmed to verify, as a function of the entirety of the tag information and reader information, whether the locating device has been placed correctly in its given position in relation to the dock in respect to a predefined direction between the two readers, either closer to or farther away from the dock in the order of succession of the tags in the series.

For more clarity, the invention will be described in greater detail in the following by way of a preferred embodiment in which the locating device is a chock that is intended to be placed against a wheel of a vehicle parked at a dock so as to complete the immobilization of the vehicle. Such a chock, having a general wedge shape, advantageously includes, as nearest as possible to its surface that rests on the ground, two distinct radiofrequency readers that are as distant as possible from each other as permitted by the geometry and the dimension of the chock, the two radiofrequency readers being advantageously distributed on a line that is parallel to the orientation of the radio identification tags arranged in series along the access lane to the dock.

The invention provides that the two readers are capable of receiving the information originating from all the tags that are placed in their vicinity, and the analysis system employs discrimination algorithms of the type otherwise known as such in RFID devices so that the analysis system saves, for each of the readers, only the information emitted by one and only one tag. By way of non-limiting example, the analysis system will save advantageously the information emitted by the tag that is closest to each reader or, if the reader is located at an equal distance from two consecutive tags, will typically save only the information originating from the tag that is closest to the dock.

According to another of its features, the invention provides that, once a vehicle is no longer parked at the dock, the chock is placed on an appropriate support arranged on the dock and that this support is equipped with a detector that is connected by communication means, which may be wireless communication means, to an analysis system for sending to it information as to the presence or absence of the chock. Advantageously, this support is connected to an electrical power supply device that enables the power of, in particular, the radiofrequency emitter of each of the readers placed on the chock to be recharged, so that the readers are able to emit a radiofrequency signal for activation and inquiry of the radiofrequency tags placed along the access lane of the dock and to transmit to the analysis system the information emitted in return by these radiofrequency tags.

The invention also provides, according to another of its features, that the chock includes advantageously means for detecting the presence of a tire of a vehicle in its vicinity as well as means for emitting to the analysis system information as to the presence of such a tire. By way of non-limiting example, the means for detecting the presence of a tire of a vehicle in the proximity of the chock may include an inductive loop that is closed when the chock is arranged against the tire and is opened in the opposite case, and that is associated with an electronic contact by means of which the information as to an opened or closed loop is transmitted by way of wireless communication to the analysis system.

The operation of the safety equipment according to the invention is thus as follows:

In the absence of a vehicle that is parked at the dock, the chock rests on its support, which thus relays to the analysis system the information that the chock is present.

More specifically, the analysis system performs a pairing of the chock with the chock support. To do this, the chock carries unique identification information, such as, for example, although in a non-exclusive manner, by way of a radiofrequency identification tag, and this identification information can be read by the appropriate means with which the chock support is equipped (by way of non-limiting example, a radio identification reader) as well as by the analysis system. The analysis system performs the pairing association of the identification information carried by the chock with an identification information carried by the chock support (for example, the order number in the plurality of docks). It should be noted that such a pairing is advantageously effected each time that a chock is placed on a chock support under conditions that will be specified further below. Thus, each of the chocks may be used equally with each of the chock supports when implemented for a plurality of docks.

When a vehicle is parked at a dock for a loading and/or unloading operation, the chock is taken off its support so as to be placed against a wheel of the vehicle and to ensure a total immobilization of the vehicle, so that the loading and/or unloading operations can be effected by the operators of the dock without any risk that the vehicle will move with respect to the dock during these operations, which would then compromise the safety of persons and freight.

In order for these operations to take place under optimal conditions of safety both for the personnel of the dock and for the freight, the invention provides that, once the chock is taken off its support, the detector of the presence of the chock with which the support is provided sends information regarding the absence of the chock to the analysis system associated with the dock.

The invention provides that, subsequently, the various readers and detectors placed on the chock relay to the analysis system associated with the dock, on the one hand, the information received from radiofrequency identification tags placed in the vicinity of the chock and, on the other hand, information as to the detection or not of the presence of a tire of a vehicle in the vicinity of the chock.

According to another of its features, the invention provides that the dock is also equipped with means for signaling, which indicates, at the end of a predefined period of time, such as, for example, a period representative of the average time required for placing the chock against a wheel of a vehicle, whether, on the one hand, the analysis system has indeed received the various information transmitted by the radiofrequency readers and the detector of the presence of a tire and whether, on the other hand, this information indeed indicates that the chock is correctly positioned both in the vicinity of the tire of the vehicle and in the predetermined direction indicated beforehand in regard to the succession of tags along the access lane of the dock.

By way of non-limiting example, these means for signaling may include an illuminated display that lights up in different colors depending on the information received by the analysis system and indicates whether or not the chock has been arranged in the predetermined direction and in the vicinity of the tire of a vehicle, such as, for example, an illuminated indicator that lights up green when the chock has been correctly arranged and an illuminated indicator that lights up red in the opposite case, possibly associated with an audible warning signal in the latter case.

In one of its particular embodiments, the invention provides that, once the information about positioning of the chock has been received and validated by the analysis system (detection of the presence of a tire of the vehicle in the immediate proximity of the chock, predetermined direction of placement of the chock with respect to the succession of radio identification tags along the access lane), the validation performed by the analysis system ceases. In other words, once the positioning of the chock is validated in the vicinity of the vehicle, the analysis system ceases to process the information received from the radiofrequency readers and detector of the presence of a tire and do so until the chock is moved once again.

However, according to a particularly advantageous embodiment, the invention provides that the chock transmits at regular intervals of time (by way of non-limiting example, at intervals of a few seconds) all or part of its positioning information to the analysis system, such as, for example, the information that it receives from the radiofrequency tags arranged along the access lane to the dock.

In all cases, the invention provides that the validation information as to the position of the chock in relation to the vehicle, as well as, if appropriate, all information about untimely movement of this chock in the course of warehouse operations, can be communicated to personnel working on the dock.

For this, according to another of the features of the invention, the chock is also advantageously provided with a detector of, for example, the accelerometer type, which is capable of sending to the analysis system information about the movement of the chock. In addition, the invention provides that, when this signal has been received and when the registered movement exhibits an amplitude greater than a threshold fixed beforehand, the analysis system verifies the information as to detection of the presence of a tire of a vehicle. If, after a predefined period of time, information as to the presence of a tire of a vehicle has not been received by the analysis system, the invention provides that the analysis system commands, at the end of a predefined period of time, the signaling, on the dock, of information representative of the return or not of the chock onto its support on the basis of the information as to the presence or not of the chock transmitted to the analysis system by the detector placed on the support of the chock.

This makes it possible, on the one hand, to guarantee that the chock rests correctly positioned in relation to the vehicle throughout the operation of loading and/or unloading and that it is not moved inadvertently, even slightly, which could put in danger the safety of the warehouse operations. Furthermore, this also makes it possible, in the case where the chock is slightly moved in the course of the warehouse operations, to prevent any untimely triggering of a warning signal on the dock, indicating that the chock has been moved, but not placed back on its support. This makes it possible, in addition, to eliminate any risk of losing a chock and, finally, it makes it possible to ensure that each chock, at the time it is used, is in a charged state that is sufficient for the readers and detectors contained in it to function optimally and during the period of time required for the operations of warehousing freight.

Once the loading and/or unloading operations have been concluded, the chock is withdrawn so as to be placed back on the support with which it was paired beforehand. In a manner analogous to the case where the chock is accidentally moved during the warehouse operations, the invention provides that the analysis system commands after a predefined period of time, the display on the dock, of information representative of the return or not of the chock onto the support to which it was paired beforehand.

The invention also provides that the analysis system commands the means for display in order to signal an error in the case where the chock might be unduly placed back, after use, onto a support different from that with which it had been paired, while, at the same time, the chock paired with this support is being used. Concomitantly, the invention also provides for the prevention, in this case, of any new pairing of the chock that has been placed back with the support whose chock is being used.

In the case where safety equipment according to the invention is employed for a plurality of docks, the invention provides, according to various embodiments, that an analysis system is associated with each dock or that a central analysis and monitoring system ensures the management of all the information that is emitted and received by the plurality of identification tags placed along the various access lanes to the various docks as well as by the plurality of radiofrequency readers and detectors for the presence of a tire situated on the various chocks.

According to one of its features in the case where an analysis system is associated with each of the docks of a plurality of docks, the invention provides that a chock that has been taken off the support with which it is paired on a given dock, so as to be arranged against a tire of a vehicle parked with respect to this dock, relays to all the analysis systems of all the docks located in proximity the information that it receives from radiofrequency tags that are located in its vicinity as well as the information as to the detection or not of the presence of a tire in its immediate vicinity. In this case, only the analysis system that has received beforehand, from the support with which the chock was paired, information about the absence of this chock will save the information transmitted by this chock and will indicate, by the means of signaling referred to further above, whether the loading or unloading operations of the vehicle may be commenced or not. Likewise, if the chock has been placed on a vehicle that is parked at a dock different from that to which it was associated by way of its pairing to the chock support, the invention provides that the analysis system of the dock with which the chock was paired commands, the display means to signal an error in the placement of the chock based on tag information transmitted by this chock.

The pairing of each chock thus makes it possible here to prevent any malfunction of the system following a possible placement of the chock with respect to a dock other than that corresponding to the chock support with which it has been paired, particularly in the case where several docks, situated side by side, are in a situation of each receiving a vehicle that needs to be loaded with freight and/or unloaded of freight. In addition, the modular design allows the analysis system to be used identically for each of the docks, which makes it possible, at minimum cost, by allowing the addition or the removal of one or more pieces of equipment without any repercussion to the docks already equipped. This modular design is reinforced, moreover, by the fact that, as indicated further above, it is possible to use equally any chock whatsoever with any support whatsoever by means of prior pairing.

In the case where a central analysis and monitoring system ensures the management of all the information emitted and received by the plurality of radio identification tags placed along the various access lanes to the various docks, each chock will send back to the latter the information that it receives from the tags placed along the access lane to the dock that is provided with the chock support of the chock with which it has been paired (access lane on which is parked the vehicle against which it has been placed to immobilize the vehicle), as well as the information as to the detection or not of the presence of a tire in its immediate vicinity. The invention thus provides, according to its various embodiments, that the central analysis and monitoring system commands the means for signaling arranged at each of the docks or the centralized means for signaling locating each of the various docks and indicating whether loading and/or unloading operations may be undertaken under conditions of satisfactory safety insofar as the immobilization of the vehicle being loaded and/or unloaded is concerned.

It follows from the above that the invention makes it possible, at any moment, at a given dock, to know in a simple, quick, and low-cost manner the state of placement of a chock that is intended to be arranged against a wheel of a vehicle so that loading and/or unloading operations of freight from or to this vehicle may be undertaken under conditions in which the vehicle is immobilized satisfactorily with respect to the safety of warehouse operators and freight. The invention may be employed in a very simple and modular manner for a plurality of docks, without any complication for the analysis system and for the processing of information transmitted by the mobile locating element—here, a chock which has just been described.

DETAILED DESCRIPTION OF EMBODIMENTS

Figure 1:
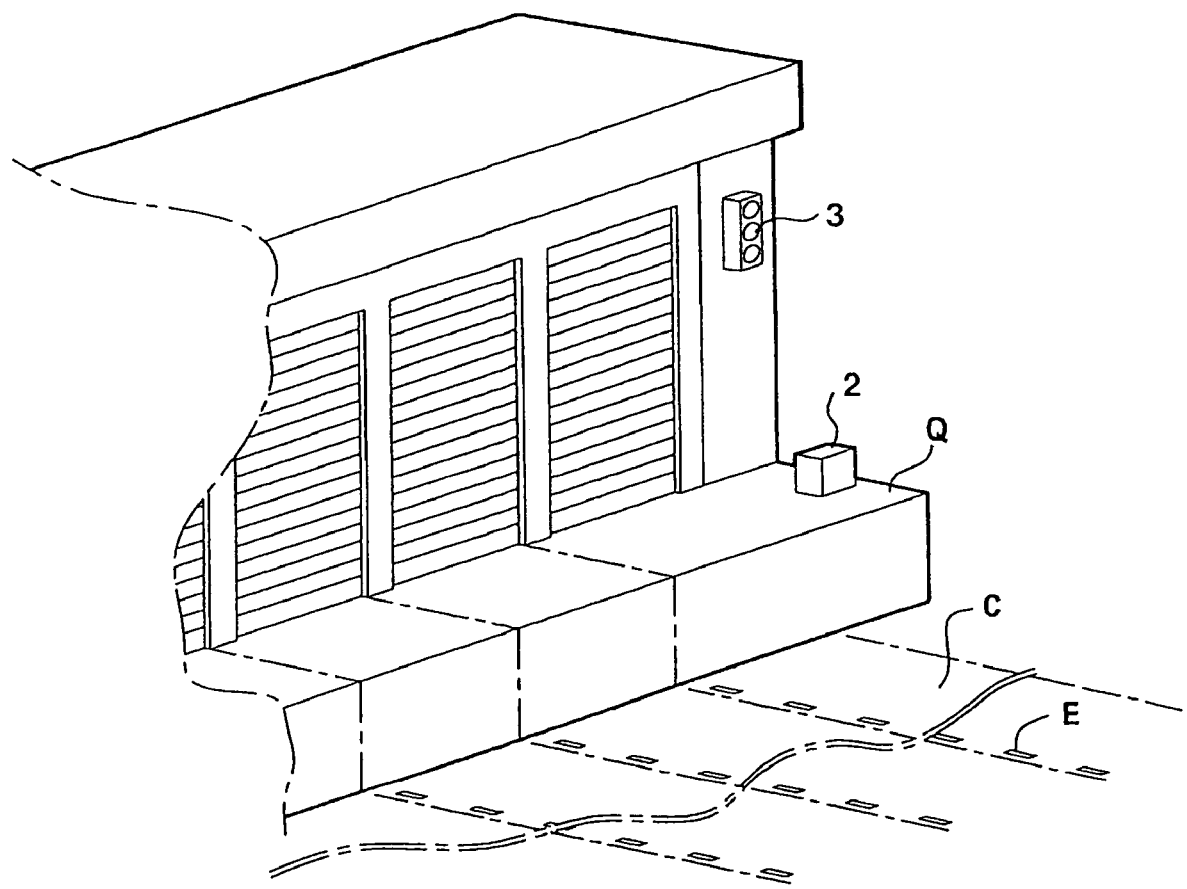
FIG. 1 is a schematic view of the tag layout on a plurality of docks.

With reference to FIGS. 1-4, the safety equipment according to exemplary embodiments of the invention includes a mobile locating device 1, which is intended to be placed in predetermined position relative to a vehicle V parked at the front of a dock Q. According to the preferred embodiment of the invention represented by the figures, this mobile locating device is a chock 1, which is specially equipped therefore. As a chock, it has a general wedge shape and is intended to be placed against one of the wheels of the vehicle V so as to complete the immobilization of the vehicle and to prevent it from moving during freight loading and/or unloading operations, since such a movement could result in persons or equipment falling between the dock and the loading platform of the vehicle.

The chock 1 contains at least two radio identification readers L1 and L2, which are capable of receiving and transmitting to an analysis system 5, which is associated with the dock Q, the information that is carried by a plurality of radio identification tags E distributed along the access lane C of the vehicle to the dock Q. These readers are placed advantageously closest to the surface of the chock 1 that is intended to be in contact with the ground when the chock is arranged against one of the wheels of the vehicle and the readers preferably are as distant from each other as permitted by the dimensions and geometry of the chock. According to the embodiment represented in the figures, in which the chock 1 exhibits, in side view, the shape of a right triangle, the hypotenuse of which is intended to come into contact with one of the wheels of the vehicle, the readers L1 and L2 are advantageously arranged, one in the vicinity of the right angle formed by the supporting surface of the chock on the ground and one of the surfaces of the chock and the other in the vicinity of the opposite angle on the supporting surface of the chock 1 on the ground.

It should be noted that, according to various non-limiting embodiments of the invention, the radio identification tags E can be equidistant along the access lane to the dock or they can be arranged in such a manner as to be closer to one another in the vicinity of the dock than at a distance from the dock. In all cases, the distance between two consecutive tags is preferably less in comparison to the distance separating the two readers L1 and L2.

The chock 1 is also equipped with a proximity detector 4 that detects the presence of a tire in its vicinity, such as a tire of the vehicle V. By way of non-limiting example, this detector 4 may consist of an inductive loop that opens or closes, depending on whether or not the chock is placed in the proximity of a tire. The detector 4 detects the metal in the tire carcass. According to the invention, the proximity detector emits, in the direction of the analysis system, a signal for the presence or not of a tire in the proximity of the chock 1, a signal that is representative of the fact that the chock 1 has been really positioned against one of the wheels of the vehicle V. Advantageously, this signal is transmitted by means of wireless communication.

The chock 1 is equipped, in addition, with a movement detector M of, for example, the accelerometer type, that transmits to the analysis system a signal that is representative of a movement of the chock. Advantageously, a minimum threshold of the amplitude of such a movement is applied to this signal in such a manner that only the significant movements of this chock are taken into account by the analysis system.

Furthermore the chock 1 carries identification information in the form, by way of non-limiting example, of a radio identification tag 7.

A support 2 of the chock 1 is, furthermore, placed on the dock Q. The chock support 2 is intended to receive the chock 1 when no vehicle is parked with respect to the dock Q. Advantageously, the chock support 2 is connected to electric power supply and electrical recharge device 6, which enable the radiofrequency device of the readers L1 and L2 to be supplied with power, by which the readers can, on the one hand, activate the radio identification tags to emit 7 information they carry and on the other hand, the readers can transmit this information to the analysis system.

The chock support 2 also includes a detector 8, which is capable of transmitting to the analysis system, preferably by wireless communication, information as to the presence or not of the chock 1 on the chock support 2.

The chock support 2 is, in addition, provided with a device for reading the identification information 9 that the chock 1 carries—for example and in a non-limiting manner, a radiofrequency identification reader in the case where the identification information of the chock is inscribed on a radio identification tag.

The invention provides that the analysis system 5 performs the pairing of the chock 1 to the support 2 (and, from there, to the dock on which this chock support is placed) by associating the identification information carried by the chock 1 with a piece of identification information attributed to the chock support 2, such as, for example, an order number of the dock on which this support is placed in a series of docks. It should be noted that, in order to increase the flexibility and the modularity of the installation according to the invention, this pairing is performed each time that any chock is placed on any chock support. However, the invention makes it possible to prevent any untimely pairing of a chock to a chock support—for example, in the case where a chock being used might be inadvertently placed back on a chock support different from that with which it was paired beforehand and for which the chock might be in use on a vehicle immobilized for freight loading and/or unloading operations.

According to one of the features of the invention, each of the radio identification tags E carries information representative of its position in the succession of radio identification tags placed on the same access lane C as it. Likewise, if the logistics complex includes a plurality of docks, the invention provides that each of the radio identification tags E also carries information representative of the dock at the access lane at which it has been placed in the series of docks of the logistics complex.

More specifically, if N radio identification tags E, numbered 1 to N, are placed on the access lane to one of the P docks, numbered 1 to P, of a logistics complex, each of the tags placed at each of the access lanes C at each of the docks Q will carry information of the form $E_{j,i}$ with $1 \leq j \leq P$, and $1 \leq i \leq N$.

The invention thus provides that each of the readers L1, L2 emits to the tags E, which are placed in its vicinity, an inquiry signal and transmits to the analysis system, in turn, the information in the form $E_{j,i}$ mentioned above, which these tags carry, as well as information representative of each of the readers. According to another of the features of the invention, the analysis system contains algorithms 10, which are otherwise known as such and which, starting from this information, perform for each of the readers L1, L2 the selection of one and only one piece of information representative of one and only one of the tags E. By way of non-limiting example, the analysis system can save only the information of the form $E_{j,i}$ originating from the tag that is closest to the reader under consideration or else the analysis system may save only the information of the form $E_{j,i}$ originating from the tag that is, at once, closest to the reader under consideration and closest to the dock under consideration.

According to another of the features of the invention, the analysis system also is capable of discriminating between the readers L1 and L2 so as to be able to attribute to each of these readers the information of the relevant form Ej,i saved by these.

According to the invention, the analysis system also provides for comparing the information of the form Ej,i saved by each of the readers so as to determine whether the chock 1 has been placed or not in a predefined direction with respect to the succession of tags E along the access lane to the dock under consideration.

The operation of the safety equipment according to the invention is thus as follows:

When a vehicle V is parked with respect to a dock Q so as to be loaded with freight and/or unloaded of freight, the chock 1 is taken off its support 2 so as to be placed against a wheel of this vehicle in order to complete the immobilization of the latter.

The detectors for the movement and presence of the chock 1 on its support then transmit to the analysis system, respectively, information about the movement of the chock 1 and information about the removal of the latter from its support 2.

Once the chock 1 has been placed in the vicinity of one of the wheels of the vehicle V, the readers L1 and L2 transmit to the analysis system 5 the information that they receive from the radio identification tags E in their vicinity and the analysis system performs the comparison of this information in order to deduce information representative of the correct or incorrect positioning of the chock 1 relative to the succession of tags E along the access lane to the dock.

Figure 2:
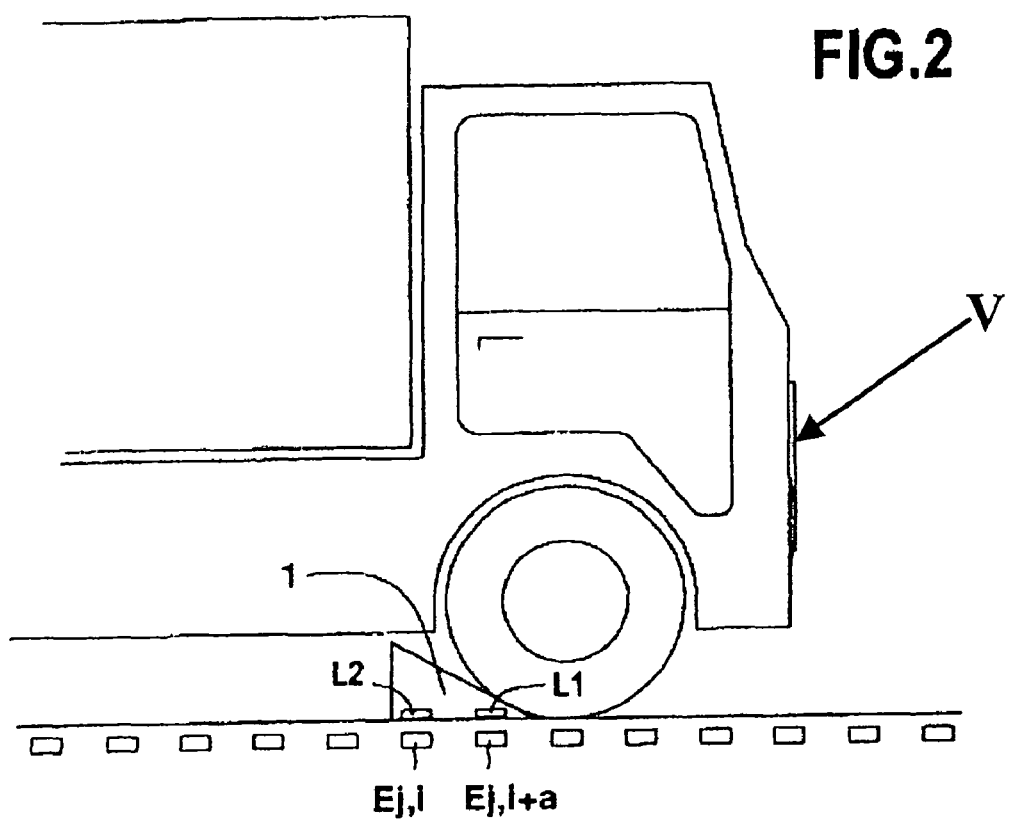
FIG. 2 is a schematic close-up view of a dock provided with safety equipment according to the invention in which the mobile locating element is a chock that is placed against a wheel of a vehicle and improperly positioned with respect to the vehicle and the dock, FIG. 3, which is a close-up schematic view of a dock provided with safety equipment according to the invention in which the mobile locating element is a chock that is placed against a wheel of a vehicle and is properly positioned with respect to the vehicle and the dock.
Figure 3:
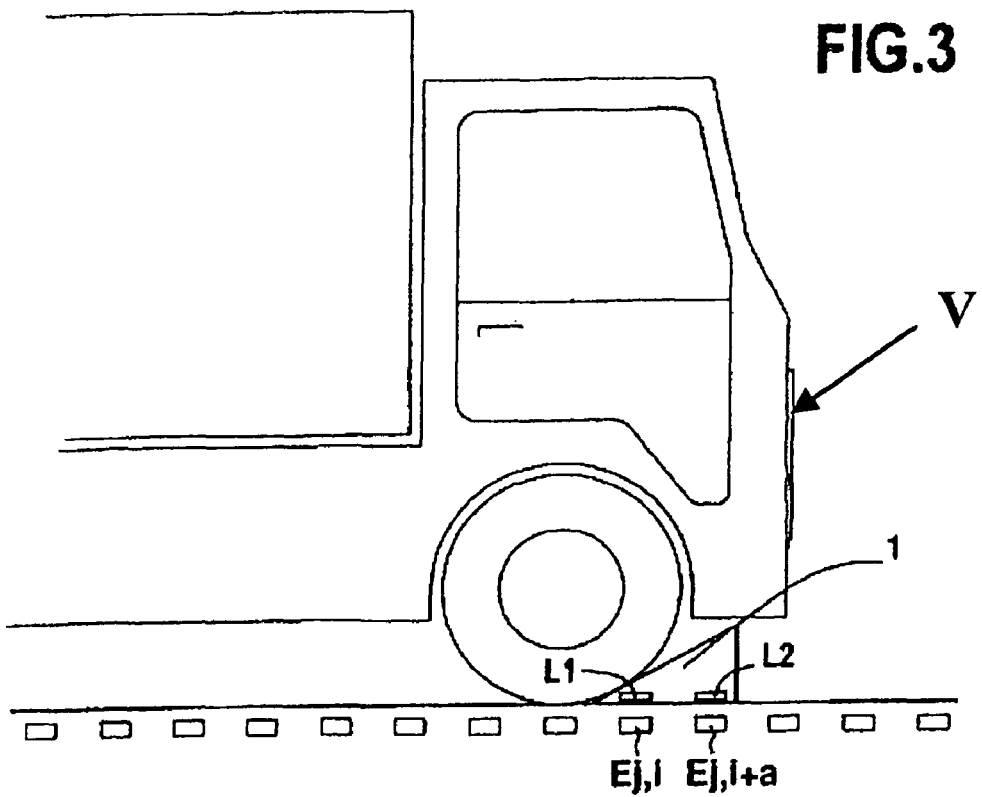
Figure 4:
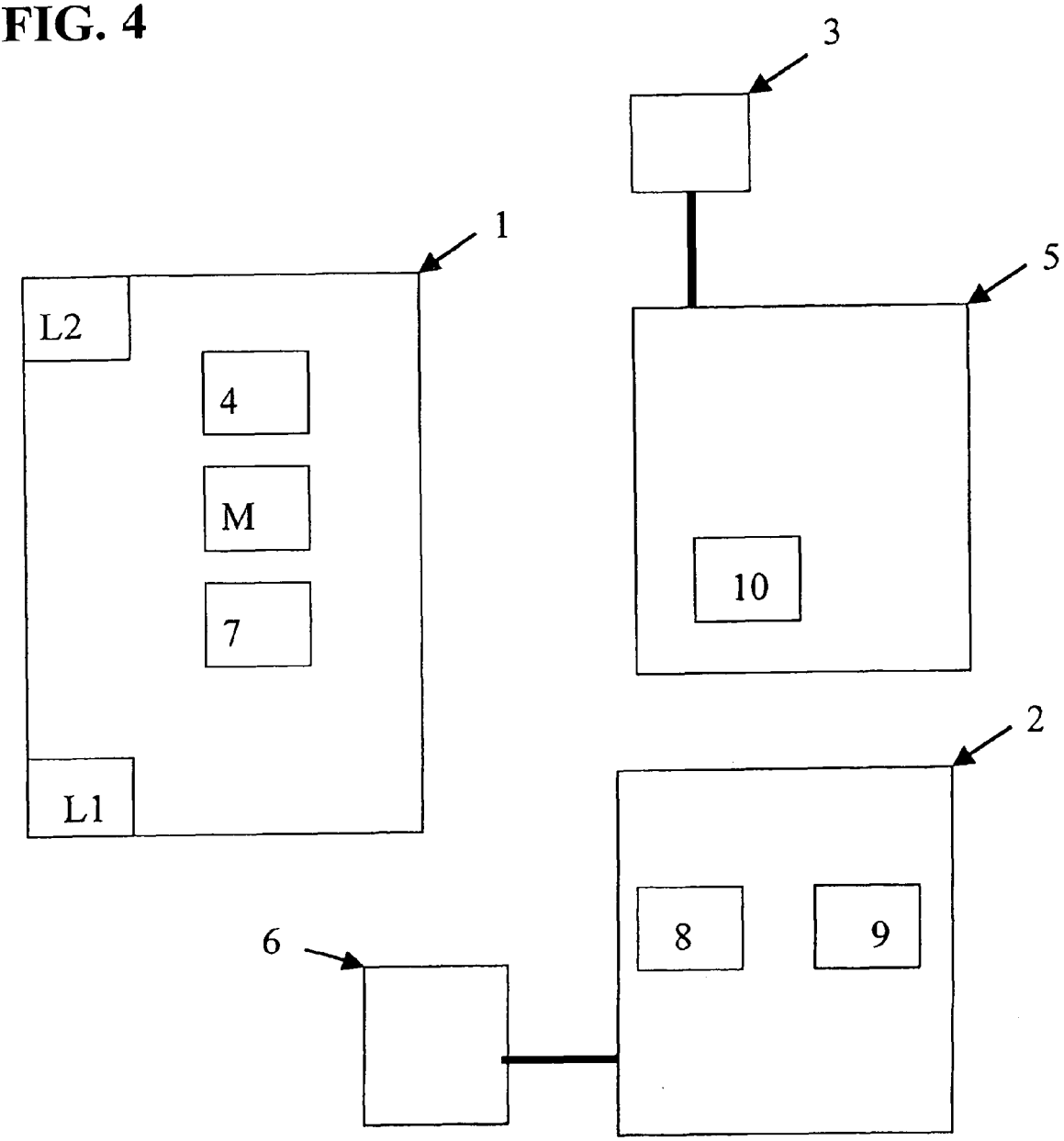
FIG. 4 is a schematic of the safety equipment for loading and unloading docks.

FIGS. 2 and 3 illustrate, in greater detail, the implementation of this comparison, with FIG. 2 representing a case in which the chock 1 has not been placed correctly against a wheel of a vehicle V and FIG. 3 representing a case in which the chock 1 has been placed correctly against the wheel. According to the embodiment illustrated by these figures, the tags E are numbered 1 to N, starting at the dock Q, and the analysis system saves, for each of the readers L1 and L2, the information of the form Ej,i representative of the tag E that is, at once, closest to this reader and closest to the dock Q, that is, in other words, the information of the form Ej,i originating from the plurality of tags in the vicinity of each of the readers for which the index i is lowest.

It thus would appear that, in the case where the chock 1 has not been placed correctly (see FIG. 2), the analysis system will save, for the reader L2, a piece of information of the form Ej,i and will save, for the reader L1, a piece of information of the form Ej,i+a, with a >0. Conversely, in the case where the chock 1 has been placed correctly (see FIG. 3), the analysis system will save, for the reader L1, a piece of information of the form Ej,i and will save, for the reader L2, a piece of information of the form Ej,i+a, with a >0. Thus the analysis system is capable, as mentioned above, of differentiating between the readers L1 and L2, and can deduce, from the saved information of the form Ej,i and Ej,i+a for each of the readers L1 and L2, information representative of the direction of placement of the chock 1 relative to a succession of tags E along the access lane to the dock Q.

As has been mentioned above, the analysis system also collects from the proximity detector information representative of the proximity of the chock 1 to the wheel of the vehicle V against which it has to be placed.

According to another of its features, the invention provides that the analysis system commands the display and signaling means 3 preferably advantageously arranged on the dock Q in order to indicate to the personnel of the dock whether the operations of loading and/or unloading the vehicle V can or cannot be undertaken.

More specifically, the invention provides that, in the case where the result of the comparison of information received from radio identification tags and saved for each of the readers indicates that the chock 1 has not been placed correctly with respect to the direction of succession of the tags E along the access lane to the dock Q or in the case where in the information received from the proximity detector indicates that the chock has not been placed sufficiently close to the wheel of the vehicle V, the analysis system commands the display and signaling means 3 in order to indicate to the personnel of the dock that the operations of loading and/or unloading the vehicle V may not be undertaken. Such a display may, for example, take the form of the lighting up of an illuminated indicator in a red color in the area of the dock, possibly in association with the activation of an audible warning signal.

Conversely, in the case where the entirety of information received, at once, by the proximity detector 4 and the readers L1 and L2 indicates that the chock 1 is placed, on the one hand, close to one of the wheels of the vehicle V and is arranged, on the other hand, in a correct direction relative to the succession of radio identification tags E along the access lane to the dock, the invention provides that the analysis system commands the display and signaling means 3 in order to indicate to the personnel of the dock that the operations of loading and/or unloading of the vehicle may be undertaken. By way of non-limiting example, such a display may take the form of the lighting up of an illuminated indicator in a green color in the area of the dock.

Once the warehouse operation has been concluded for the vehicle V, the chock 1 is removed from the wheel against which it was placed. The movement detector M that it contains then transmits movement information to the analysis system. When the chock 1 is placed back on the chock support 2 with which it has been paired, the detector for the presence of the chock transmits to the analysis system, in turn, a piece of information about the return of the chock onto its support.

The invention thus proposes simple means and a simple piece of equipment in order for warehouse operations (loading, unloading of freight) at a vehicle parked with respect to a dock of a logistics complex to be undertaken under conditions that are satisfactory insofar as the immobilization of this vehicle with respect to the dock is concerned.

It should be noted that, with a view to improving the operation and reliability of the operation of such equipment, the invention offers a number of features that are additional to the features that have just been mentioned.

According to one of these additional features, the invention provides that the analysis system controls the display means 3 for indicating that the loading and/or unloading operation may not be undertaken if the information originating from the proximity detector and originating from the readers L1 and L2 has not been received by the analysis system in a period of time fixed beforehand, starting at the moment when the detectors for the movement and presence of the chock on its chock support 2 have transmitted to it the information mentioned further above as to the movement of the chock 1 and the removal of the latter from its support. By way of non-limiting example, the period of time fixed beforehand, cited above, analogous to a time delay of the means of the analysis system, may be fixed on the basis of the average time required for installation of the chock against a wheel of a vehicle at the dock.

Furthermore, regardless of the embodiment taken for the invention, in particular that the chock ceases to transmit its placement information once the position has been validated or, conversely, that it continues to transmit at regular intervals (by way of non-limiting example, at intervals of a few seconds, typically 3 to 20) its position information to the analysis system, the invention provides automatic means of alerting operators about the state of immobilization of the vehicle throughout the freight loading and/or unloading operations.

To this end, the invention provides that, when a signal is transmitted to the analysis system by the movement detector, a signal representative of a significant movement (that is, representative of a movement whose amplitude is greater than a predefined threshold), a new validation of the presence of a tire in the immediate vicinity of the chock 1 is performed. If, in a period of time that is predefined starting from the moment when the analysis system has received information of significant movement on the part of the movement detector, this same analysis system has not received from the proximity detector information about the immediate vicinity of a tire of the vehicle, it then commands a validation of the return of the chock 1 onto the support with which it has been paired and commands the display means 3 for signaling an error (for example, by lighting up an illuminated indicator in orange or red color) in the absence of reception, in a given period of time of a signal, originating from the presence detector and representative of the return of the chock onto the support 2 with which it has been paired. In other words, when a signal of significant movement is emitted by the chock, a time delay is triggered at the analysis system, at the end of which, if no information of immediate proximity of a tire (representative of the immediate proximity of the vehicle) has been received, a new time delay is triggered at the system analysis. If, at the end of this second time delay, no signal for the presence of the chock on the support with which it has been paired has been received by the analysis system, the latter then commands the display means 3 to indicate an error.

This makes it possible, in particular, to avoid undue display of error signals at the display means 3 when, for example, the vehicle has moved slightly during the warehouse operations and when this movement is sufficiently slight to not put in danger the operators, although it is sufficient so that said proximity detector no longer transmits the information according to which the chock 1 is placed against a tire of the vehicle. Alternatively, the sensitivity of said detector can also be adjusted so that it transmits only the information relating to a distancing of the chock with respect to the tire that is greater than a predefined distance threshold. It also follows that this makes it possible to ensure the immobilization of the vehicle under conditions that are satisfactory for the safety of the operators and the freight throughout the duration of the warehouse operations.

This also prevents any chock loss and makes it possible to ensure that, outside of its periods of use, the chock is well charged by the electric power supply device associated with the chock support 2, thus guaranteeing a stable and reproducible operation of the equipment according to the invention in all cases.

Furthermore, the invention provides that the pairing of a chock with a support be performed only under the condition that no chock that has been paired beforehand with this support is being used. This makes it possible to prevent, in particular, any error that may result from the placement inadvertently of a chock back onto a support other than that with which it has been paired beforehand, while the chock corresponding to this support is being used. To this end, the analysis system commands the display means 3 for indicating an error in the case when an attempt is made to place a chock back onto a chock support 2 that is different from that with which it has been paired, while the chock paired beforehand with this support is in the course of being used. This is particularly simple to implement in the case where the chock transmits to the analysis system, at regular intervals, all or part of its placement information (information received from the radio identification tags arranged along the access lane to the dock and/or information about the proximity of a tire of a vehicle).

As has been mentioned further above, it should be noted that, in the case where the logistics complex, includes a plurality of docks, the invention may equally provide that each of the docks is equipped with an analysis and monitoring system or else with a central analysis and monitoring system that manages all of the docks. Likewise, the invention may equally provide that the display means 3 are arranged at each of the docks or else that the display is centralized for the plurality of docks, with an identification device for each dock, or else that the two display systems are used concomitantly (display in the area of each of the docks and centralized display).

In the case where each of the docks is equipped with an analysis system, regardless of the configuration taken for the display, the detectors and readers placed on any chock that has been taken off its support, so as to be arranged against a wheel of a vehicle parked with respect to any of the docks, will transmit the information that it receives to the plurality of analysis systems of all of the docks. The invention provides, according to another of its features, that only the analysis system corresponding to the dock equipped with the support with which the chock under consideration has been paired beforehand will command the processing means it contains for analyzing this information. It follows that only the display means 3 governed by this analysis system will be controlled by it.

This point offers, in particular, a double advantage. In the first place, it makes it possible to simplify the installation and hence to reduce the costs. In fact, it allows the same material to be used for all of the docks, both insofar as the chock is concerned and insofar as the readers, detectors, analysis systems, and displays are concerned, without the necessity of discriminating any of these materials from any others. This is particularly true insofar as the chocks are concerned, which may thus be used equally at one or the other of the docks of the logistics complex, with their identification relative to the dock along whose access lane they are placed being made by means of their pairing to the chock support associated with this dock. Furthermore, this ensures the modularity of the installation according to the invention and thus its potential application at low cost to logistics complexes whose capacity may be called on to vary in terms of docks.

However, the invention, as just described, should not be understood as being limited to the embodiments and means that have been mentioned above, but rather it extends to all equivalent means and to any technical combination that operates by such means. In particular, by way of non-limiting example, the mobile locating device 1, in this case a chock that is intended to be placed against a wheel of a vehicle parked with respect to a dock, may be any other type of such a chock to the extent that it is representative, by its position and its direction of placement with respect to a succession of radio identification tags along an access lane to a dock, of the conditions of immobilization of the vehicle under consideration.

Likewise, by way of non-limiting example, the number of readers of radio identification tags that such a mobile locating device contains is not limited to two, this number being the minimum number required for operation of the equipment according to the invention as described above. The invention may be implemented in various other embodiments within the scope of the invention.

What is claimed is:

1. Safety equipment for a dock for loading and unloading freight to and from vehicles brought to the dock, the safety equipment comprising:

radio identification tags arranged in a series along an access lane to the dock for vehicles transporting freight that are to be loaded or unloaded, the radio identification tags emitting a signal carrying an identification information characteristic of the order of succession of the radio identification tags in the series;

a mobile locating device to be removably placed in a given position with respect to a vehicle brought to the dock, the mobile locating device carrying at least two radiowave transmitter readers which are capable of sensing the signals emitted by two different radio identification tags of the series so as to relay the signals to an analysis system for the signals carrying tag identification information unique to each of the radio identification tags and of reader attribute information that distinguishes the two readers from each other; and processing means at the analysis system for processing, from the radio identification tag information and the reader attribute information, a placement of the mobile locating device in the given position in respect to a predefined direction between the two readers relative to the order of succession of the radio identification tags in the series.

2. The safety equipment according to claim 1, wherein the mobile locating device contains a proximity detector that transmits to the analysis system information representative of a proximity of the locating device with respect to the vehicle.

3. The safety equipment according to claim 1, wherein the mobile locating device contains a movement detector that transmits to the analysis system an information representative of a movement of the mobile locating device.

4. The safety equipment according to claim 1, wherein at the dock, a locating device support is connected to a power supply and an electrical recharging device for the locating device.

5. The safety equipment according to claim 4, wherein the locating device support includes a presence detector that is capable of transmitting an information representative of the presence or absence of the mobile locating device on the locating device support to the analysis system.

6. The safety equipment according to claim 4, wherein the locating device support includes means for reading identification information carried by the mobile locating device and means for transmitting the identification information to the analysis system, and the analysis system performs a pairing of the mobile locating device with the support device.

7. The safety equipment according to claim 1, wherein the mobile locating device is conformed as a chock to be placed against a vehicle tire.

8. The safety equipment according to claim 1, further comprising:

a presence detector that, in an absence of the mobile locating device in a locating device support, transmits to the analysis system information about the absence of the mobile locating device, wherein the analysis system commands a display means to indicate that a warehouse operation may be undertaken when:

the analysis system receives in a predefined period of time, information transmitted by a proximity detector that is representative of a proximity of the locating device with respect to a vehicle, and the processing means of the analysis system validates the placement of the mobile locating device with respect to the predefined direction between the two readers relative to the order of succession of radio identification tags in the series.

9. The safety equipment according to claim 8, wherein when the display means has been commanded by the analysis system, and when the warehouse operations have been achieved, the analysis system commands the display means to indicate that the mobile locating device may be used again for another vehicle when:

the analysis system receives movement information of the mobile locating device, transmitted by a movement detector, there is an absence of proximity information of the mobile locating device and the vehicle, and the analysis system receives in a period of predefined time, the predefined time starting at the moment of reception of the movement signal, information about the presence of the mobile locating device on the locating device support.

10. The safety equipment according to claim 2, wherein the mobile locating device has the shape of a chock to be placed against a vehicle tire and said proximity detector is sensitive to the proximity of a tire carcass.

11. The safety equipment according to claim 3, wherein the mobile locating device has the shape of a chock to be placed against a vehicle tire.

12. The safety equipment according to claim 4, wherein the mobile locating device has the shape of a chock to be placed against a vehicle tire.

13. The safety equipment according to claim 5, wherein the mobile locating device has the shape of a chock to be placed against a vehicle tire.

14. The safety equipment according to claim 6, wherein the mobile locating device has the shape of a chock to be placed against a vehicle tire.

15. The safety equipment according to claim 4, wherein the locating device support includes means for reading identification information carried by the mobile locating device and means for transmitting the identification information to the analysis system, and the analysis system performs a pairing of the mobile locating device with the support device.

16. The safety equipment according to claim 5, wherein the locating device support includes means for reading identification information carried by the mobile locating device and means for transmitting the identification information to the analysis system, and the analysis system performs a pairing of the mobile locating device with the support device.

* * * * *